United States Patent Office 3,634,548
Patented Jan. 11, 1972

3,634,548
POLYSTYRENE-ETHYLENE GRAFT COPOLYMER
Kenneth E. Harwell, Merriam, and Francis R. Galiano, Prairie Village, Kans., assignors to Gulf Research & Development Company, Pittsburgh, Pa.
No Drawing. Filed Aug. 11, 1969, Ser. No. 849,159
Int. Cl. C08f 29/12
U.S. Cl. 260—877
6 Claims

ABSTRACT OF THE DISCLOSURE

A graft copolymer of ethylene onto the aliphatic carbon backbone portion of polystyrene is formed by contacting polystyrene in an inert hydrocarbon medium with a complex of an alkyl lithium with a chelating ditertiary amine, then contacting the polystyrene containing reactive sites with ethylene.

BACKGROUND

This invention relates to the method of preparing a graft copolymer of an alpha-olefin onto the aliphatic carbon backbone portion of polystyrene in the presence of an alkyl lithium chelating ditertiary amine complex catalyst and the product formed by this method.

It is known to make graft copolymers of alpha-olefins onto the benzene nucleus of polystyrene in U.S. Patent 3,187,067 to Beredjick. It is also known to polymerize ethylene with an alkyl lithium chelating amine complex catalyst in a paper by A. W. Langer, Jr. of Esso Research and Engineering Company, Linden, N.J., published in ACS Polymer Preprints 7 No. 1, 132 (1966).

SUMMARY OF THE INVENTION

We have now discovered that a complex of an alkyl lithium with a chelating ditertiary amine is capable of reacting with styrene polymers in solution to give a polystyrene containing active reaction sites on the polymer backbone which are also capable of initiating ethylene polymerization. In addition, the growing ethylene chains can also react with other sites on the polystyrene molecule resulting in termination of the original ethylene chain and initiation of a new chain. The resulting product is a graft polymer of polyethylene onto polystyrene where the ethylene chains are of random length and are attached at random along the polystyrene aliphatic carbon backbone.

The polystyrene-ethylene graft copolymer will be useful as a high impact strength, solvent resistant thermoplastic. It would find use as molded household utensils, for example. The copolymer has improved stiffness and hardness as compared to ethylene homopolymers and improved impact strength and solvent resistance as compared to polystyrene homopolymers.

PREFERRED EMBODIMENTS

Preparation and analysis of butyllithium complex catalyst

Butyllithium, hereinafter abbreviated BuLi, solution, 100 ml. (0.254 mol) was added to a 200 ml. flask by means of a syringe through a rubber septum. The flask had been thoroughly cleaned, dried in a vacuum oven and filled with argon. Then tetramethylethylenediamine, hereinafter abbreviated TMEDA, 29.6 g. (0.254 mol) was added in the same way. The flask was cooled in ice water to avoid a temperature rise. The rubber septum was then tightly wrapped with aluminum foil to prevent gases ($CO_2$, $O_2$, etc.) from diffusing through on long standing.

After five days the BuLi-TMEDA was analyzed and found to contain 2.09 meq./ml. Analysis after 16 days at room temperature showed no decrease in activity although its color was darker.

Preparation of graft polymers

Graft polymerizations were carried out using both anionically polymerized polystyrene resins of narrow molecular weight distribution and commercial, high molecular weight resins. Four runs were made which differed mainly in source of the polystyrene. In each run, one liter of a 10% solution of polystyrene in cyclohexane was used. This was charged to the reactor followed by portions of BuLi, until the yellow styryl anion color was seen. This was done to destroy reactive impurities in the system. The desired amount of BuLi-TMEDA catalyst was then added followed by ethylene.

The polystyrene used in Run No. 2 was prepared directly in the reactor in the following manner. A solution of 100 g. of styrene in 1000 ml. of cyclohexane was added to the reactor under argon. To destroy reactive impurities, BuLi was added until samples showed it to exist in the solution. Then 1.0 ml. (2.5 meq.) of BuLi solution was added for polymerization. After four hours, a sample was withdrawn and mixed with ethanol. A heavy precipitate formed showing much polystyrene had formed.

Run No.: Polystyrene source
1 ———————— Previously prepared with BuLi (87,000 g./mol).
2 ———————— Prepared in situ ($\approx$40,000 g./mol).
3 ———————— Dow Styron 666 ($\approx$150,000 g./mol).
4 ———————— Dow Styron 666 ($\approx$150,000 g./mol).

REACTION CONDITIONS

| Run | 1 | 2 | 3 | 4 |
|---|---|---|---|---|
| $C_2H_4$ pressure, avg. p.s.i | 900 | 875 | 975 | 1,000 |
| Temperature, °C | 30 | 35 | 28 | 70 |
| BuLi solution, ml | 3.5 | | 3.0 | 2.0 |
| BuLi-TMEDA: | | | | |
| Amount, ml | 10 | 5 | 5 | 5 |
| Activity, meq./ml | 2.09 | | 1.65 | 1.65 |
| Concentration, g./100 g. PS* | 0.377 | | 0.300 | 0.300 |
| Age, days | 5 | 16 | 42 | 44 |
| Time,[a] min | 40 | 60 | 35 | 15 |
| Reaction time,[b] hrs | 4 | 18 | 18 | 18 |
| Ethylene, amount in product,[c] grams | 35.0 | 30.8 | 18.8 | 3.40 |

[a] Time allowed for BuLi-TMEDA to react with PS* prior to $C_2H_4$ addition.
[b] Ethylene reaction time.
[c] Calculated from data in the following table.
*Polystyrene.

In all runs the ethylene absorption was essentially complete within about two hours.

All of the reaction products were soft solids swollen with solvent, whereas the starting materials were clear polystyrene solutions. This indicates that sufficient alkylation occurred to make the polymer insoluble in cyclohexane. In each run the solvent was decanted and evaporated to find the amount of soluble polymer. The soft solids were treated in a household blender with ethanol to remove solvent. After washing several times, the polymer samples were dried in a vacuum oven, weighed, and analyzed for polystyrene and polethylene by infrared absorption. The data obtained is listed below.

TABLE I.—REACTION PRODUCTS

| Run No. | Product, wt., g. | Solubility in cyclohexane | Analysis PS,* wt., percent | Ethylene grafted, g. |
|---|---|---|---|---|
| 1 | 4.2 | Soluble | 95.3 | 35.0 |
|   | 91.4 | Insoluble | 62.0 | |
| 2 | 0.84 | Soluble | 90.9 | 30.8 |
|   | 99.17 | Insoluble | 69.0 | |
| 3 | 2.70 | Soluble | 64.8 | 18.8 |
|   | 96.33 | Insoluble | 81.5 | |
| 4 | 10.67 | Soluble | 86.6 | 3.40 |
|   | 65.54 | Insoluble | 97.0 | |

*Polystrene.

GRAFT POLYMER PROPERTIES

| Run No.[a]: | Softening temp., °C.[b] | Inherent viscosity[c] | Density |
|---|---|---|---|
| 1 | 125 | 0.520 | 1.000 |
| 2 | 115 | 0.220 | 1.009 |
| 3 | 122 | 1.02 | 1.004 |
| 4 | 123 | 0.640 | 1.028 |
| PS[d] | 126 | | |

[a] Sample is "insoluble" fraction, i.e. in cyclohexane.
[b] Fisher-Johns apparatus used.
[c] Determined in Tetralin at 130° C.
[d] Polystyrene used for grafting in Run 1.

Under a polarizing microscope films of the copolymer showed multiple small birefringent areas characteristic of crystalline polyethylene.

To determine if the products were actually graft copolymers as distinguished from mixtures of homopolymers, a number of extractions with selective solvents weer performed. Mixtures of homopolymers would be readily separated by the extractions, whereas graft copolymers could not be separated. The amount of material soluble and insoluble, in each solvent, is given in the table below together with an infrared analysis of each fraction.

EXTRACTION STUDIES

| Sample[a] | Fraction | Methylethyl ketone Amount, wt. percent | Analysis PS,* wt. percent | Fraction | Tetrachloroethylene Amount, wt. percent | Analysis PS,* wt., percent |
|---|---|---|---|---|---|---|
| Run 1, insoluble | Soluble | 74.7 | 97.33 | Soluble | 72.4 | 92.13 |
|  | Insoluble | 25.3 | 7.00 | Insoluble | 27.6 | 26.97 |
| Run 1, C$_2$Cl$_4$, insoluble (above) | Insoluble | 79.0 | 9.1 | | | |
| Run 2, insoluble | Soluble | 68.6 | 74.2 | Soluble | 87.4 | 73.4 |
|  | Insoluble | 31.4 | 54.5 | Insoluble | 12.6 | 35.2 |
|  | | Toluene | | | | |
| Run 3, soluble | Soluble | 96.8 | 75.0 | | | |
|  | Insoluble | 3.2 | | | | |
| Run 3, insoluble | | | | Soluble | 87.3 | 93.3 |
|  | | | | Insoluble | 12.7 | 9.2 |
| Run 3, C$_2$Cl$_4$, insoluble (above) | Soluble | 11.5 | 60.0 | | | |
|  | Insoluble | 88.5 | 8.0 | | | |
| Run 4, insoluble | Soluble | 100.0 | 97.0 | Soluble | 100.0 | 97.0 |
|  | Insoluble | 0 | | Insoluble | 0 | |

[a] Fractions and runs described refer to Table I.
*Polystyrene.

Methylethyl ketone, a good solvent for pure polystyrene, is expected to have no affinity for polyethylene, and a low tolerance for polyethylene branches. It was used to extract styrene homopolymer from graft copolymer.

Tetrachloroethylene is a good solvent for both polystyrene and polyethylene when hot, but polyethylene is insoluble in it at room temperature. Thus the C$_2$Cl$_4$ was used to separate pure polyethylene from polystyrene and copolymer.

In runs 1, 2 and 3 methylethyl ketone and C$_2$Cl$_4$ gave similar results indicating negligible amounts of either pure homopolymer, although some of the fractions appear to be very lightly alkylated. The various fractions show a wide range of compositions.

This broad distribution is indicative of a random attack on the polystyrene molecule, and possibly a broad molecular weight distribution among the polyethylene chains.

In run 4 no insoluble fraction was found (clear solutions) showing the absence of polyethylene homopolymer. The fact that several percent of polyethylene was incorporated into the copolymers shows clearly a grafting reaction had occurred as anticipated.

Characterization of aliphatic carbon backbone bonding

The 60 MHz. nuclear magnetic resonance spectrum of the styrene-ethylene graft copolymer of this invention is characterized by proton resonance at $\tau$ values of 2.71, 3.13, 8.15 and 8.38 p.p.m. The resonance at 2.71 p.p.m. and 3.13 p.p.m. are characteristic of aromatic protons in polystyrene, and are present in the ratio of 3/2 just as they are in a spectrum of pure polystyrene This indicates that essentially no substitution has occurred in the aromatic portion of the polystyrene since aromatic substitution would not only have drastically altered the shape of the spectrum but would also have changed this ratio. The resonance at 8.15 p.p.m. is broad and represents the CH$_2$ protons on the polystyrene backbone chain. These are also present in a polystyrene spectrum. The line at 8.38 p.p.m. is extremely sharp and is not present in a polystyrene spectrum. It is due to the CH$_2$ protons of the ethylene side chains.

The nuclear magnetic resonance spectrum was run in tetrachloroethylene solution at 110° C.

The infrared spectra of our graft polymer clearly shows the polyethylene chains to be grafted onto the aliphatic chain of the polystyrene.

Hydrogen atoms attached to the aromatic ring absorb in 600 to 900 cm.$^{-1}$ range of the infrared spectrum. The frequency of these bands changes markedly depending on the number of hydrogen atoms on the ring and the number of adjacent hydrogen atoms. Thus infrared spectra may be used to show the substitution of other groups for hydrogen on the aromatic ring.

Except for bands due to polyethylene, the spectrum of our graft copolymer is the same as polystyrene indicating the absence of substitution on the aromatic ring.

The copolymer spectrum shows two sharp bands near 725 cm.$^{-1}$ which are characteristic of polyethylene and show its presence in the copolymer. Comparison of the spectrum of the product of this invention with a spectrum of polystyrene alkylated in a manner known to attach alkyl groups to the aromatic ring indicates considerable differences in the 600–900 cm.$^{-1}$ region of the infrared. In the spectrum of the ring alkylated copolymer, the band at 750 cm.$^{-1}$, known to be characteristic of 5 hydrogens, is greatly reduced in intensity, while new bands appear at 720 cm.$^{-1}$, 830 cm.$^{-1}$, and 890 cm.$^{-1}$ which are characteristic of two adjacent hydrogens. These bands are not present in the graft copolymers.

The presence of alkyl groups and the absence of ring substitution shows the polyethylene to be grafted onto the aliphatic "backbone" of the polystyrene.

The graft copolymer of this invention can be comprised of any alpha-olefin grafted onto polystyrene, however, ethylene is preferred. For catalyst composition the various chelating ditertiary amines can be combined with alkyl, aryl, aralkyl, and allyl-lithium compounds. The various chelating dietertiary amines which can be used in this catalyst complex are disclosed on page 132 in the article published by A. W. Langer, Jr., discussed above in the background paragraph.

The reaction of this invention can be carried out at temperatures of from about 10° C. to about 120° C., preferably about 30° to about 70° C., for a period of about 0.5 to about 20 hours, preferably about 3 to about 6 hours, at a pressure of about 100 to about 40,000 p.s.i.g., preferably about 500 to about 2000 p.s.i.g. The reaction can take place in any inert hydrocarbon medium, for example cyclohexane, alkyl cyclohexane, or other hydrocarbons capable of dissolving the styrene polymers being used. The portions of polyethylene and polystyrene present in the graft copolymer may vary from about 9 to 99 parts by weight to about 99 to 1 parts by weight of polyethylene to polystyrene, but preferably would vary from 3.4 to 96.6 parts by weight up to 35 to 65 parts by weight of polyethylene to polystyrene. The amount of catalyst complex can vary from about 0.001 part by weight to about 0.10 part by weight, and preferably about 0.002 to 0.008 part by weight of catalyst complex per part of polystyrene. The solution of polystyrene in inert hydrocarbon medium can run from about 1 to 30 percent by weight, and preferably 5 to 15 percent by weight.

The density of the graft copolymer of this invention varies, according to the relative portions of polyethylene and polystyrene, between about 0.911 and 1.11 and, similarly, the intrinsic viscosity varies between about 0.20 and 2.00.

We claim:

1. The method of preparing a graft copolymer of an $\alpha$-olefin on a polystyrene backbone wherein said $\alpha$-olefin is grafted onto the aliphatic carbon backbone portion of said polystyrene,
    consisting of contacting the polystyrene in an inert hydrocarbon medium, with a complex of a chelating ditertiary amine and a compound selected from the group consisting of alkyl lithium, aryl lithium, aryalkyl lithium and allyl lithium,
    contacting the said polystyrene containing activated reaction sites with said $\alpha$-olefin.

2. The method of claim 1 wherein the complex is butyl lithium-tetramethylethylenediamine.

3. The method of preparing a graft copolymer of ethylene on a polystyrene backbone wherein said ethylene is grafted onto the aliphatic carbon backbone portion of said polystyrene, consisting of
    contacting polystyrene in an inert hydrocarbon medium, with a complex of a chelating ditertiary amine with a compound selected from the group consisting of alkyl lithium, aryl lithium, aryalkyl lithium and allyl lithium,
    contacting said polystyrene containing active sites with ethylene.

4. The method of claim 3 wherein the complex is butyl lithium-tetramethylethylenediamine.

5. The method of claim 4 wherein said polystyrene containing active sites is contacted with ethylene at a temperature of from about 10° to about 120° C., for a period of about 0.5 to about 20 hours, at a pressure of about 100 to about 40,000 p.s.i.g., the amount of said catalyst complex present is from about 0.001 part by weight to about 0.1 part by weight of catalyst complex per part of polystyrene, the said solution of polystyrene in inert hydrocarbon medium is about 1 to about 30 percent by weight of polystyrene in hydrocarbon.

6. The method of claim 4 wherein said polystyrene containing active sites is contacted with ethylene at a temperature of from about 30° to about 70° C. for a period of about 3 to about 6 hours, at a pressure of about 500 to 2,000 p.s.i.g., with about 0.002 to 0.008 part by weight of said catalyst complex per part of polystyrene, and the said solution of polystyrene in inert hydrocarbon medium is about 5 to about 15 percent by weight of polystyrene in hydrocarbon.

References Cited

UNITED STATES PATENTS

| 2,837,496 | 6/1958 | Vandenberg | 260—878 |
| 3,328,487 | 6/1967 | Feay et al. | 260—877 |
| 3,451,988 | 6/1969 | Langer | 260—878 |

FOREIGN PATENTS

| 1,247,235 | 10/1960 | France | 260—878 |

OTHER REFERENCES

Langer: ACS Polymer Preprints, vol. 7, No. 1 (1966), pp. 132–139.

SAMUEL H. BLECH, Primary Examiner

U.S. Cl. X.R.

252—431 N; 260—32.8 A, 33.6 PQ, 33.8 UA, 583 P, 876 R, 878 R